United States Patent [19]

Faroudja

[11] 4,142,211

[45] Feb. 27, 1979

[54] BIDIMENSIONAL NOISE REDUCTION SYSTEM FOR TELEVISION

[75] Inventor: Yves C. Faroudja, Los Altos Hills, Calif.

[73] Assignee: Microtime, Inc., Bloomfield, Conn.

[21] Appl. No.: 854,102

[22] Filed: Nov. 23, 1977

[51] Int. Cl.² .......................... H04N 5/21; H04N 9/535
[52] U.S. Cl. ..................................... 358/167; 358/162; 358/36
[58] Field of Search ................. 358/162, 166, 167, 36, 358/37

[56] References Cited

U.S. PATENT DOCUMENTS

| 2,817,715 | 12/1957 | Blake | 179/171 |
|---|---|---|---|
| 3,117,278 | 1/1964 | Johnson | 325/65 |
| 3,286,024 | 11/1966 | Melchior | 358/35 |
| 3,715,477 | 2/1973 | Olson | 358/167 |
| 3,769,611 | 10/1973 | Scaggs | 325/65 |
| 3,814,847 | 6/1974 | Longuet | 358/162 |
| 3,828,280 | 8/1974 | Dolby | 325/65 |
| 3,846,719 | 11/1974 | Dolby | 333/14 |
| 3,903,485 | 9/1975 | Dolby | 325/62 |

*Primary Examiner*—John C. Martin
*Attorney, Agent, or Firm*—David B. Harrison

[57] ABSTRACT

A bidimensional noise reduction system for processing a television video signal includes a vertical dimension noise reduction system having a first adjustable threshold coring circuit and a horizontal noise reduction system having a second adjustable threshold coring circuit.

10 Claims, 8 Drawing Figures

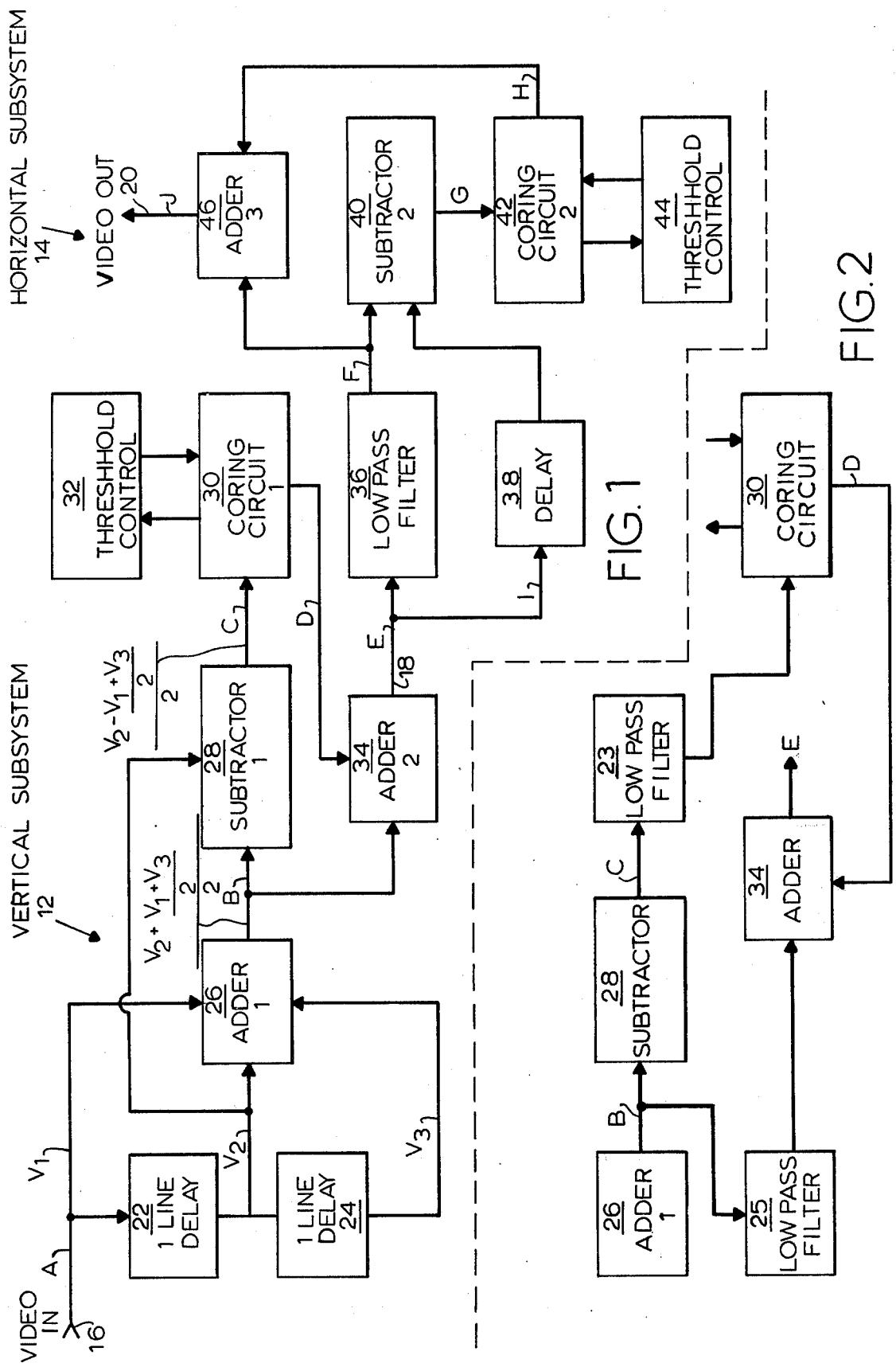

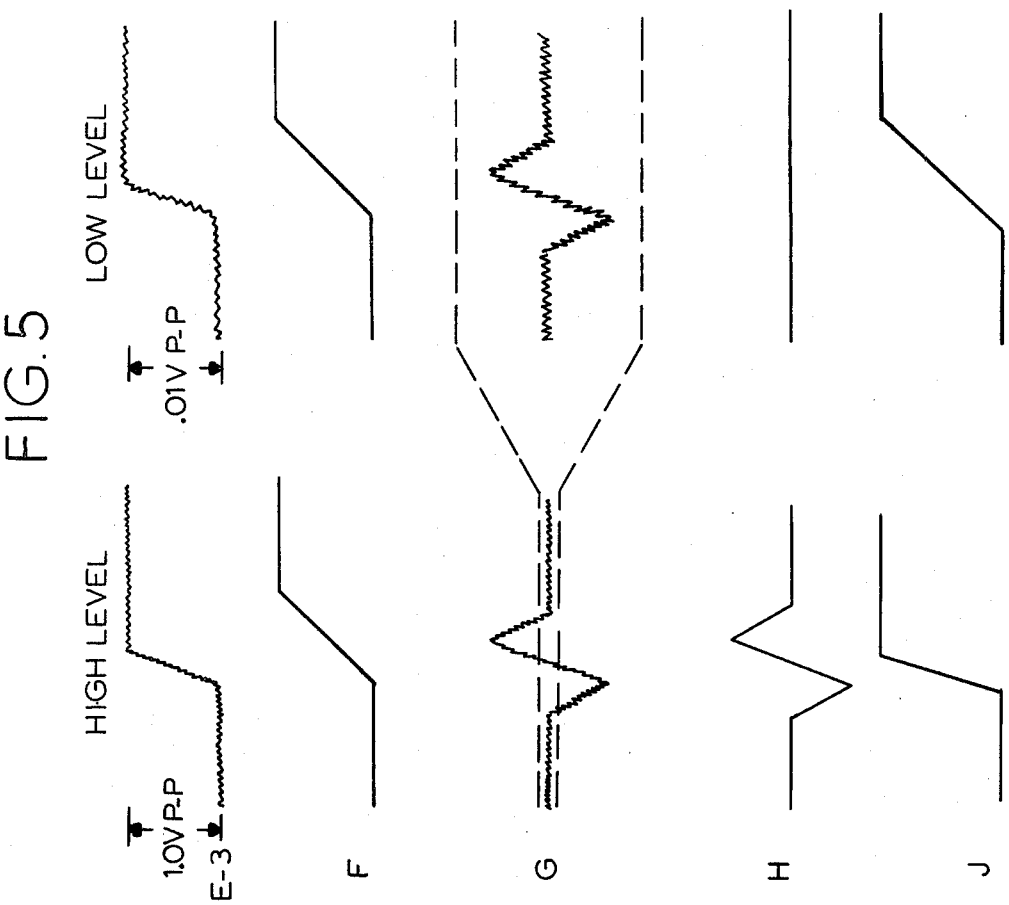

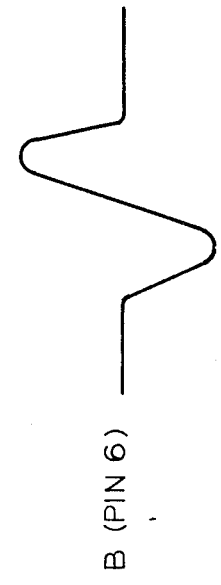
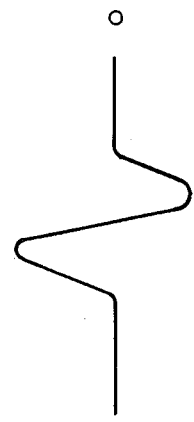
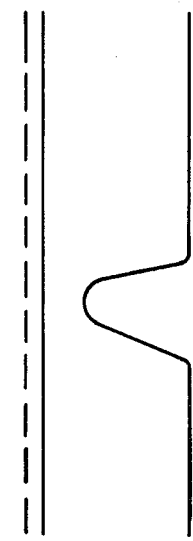
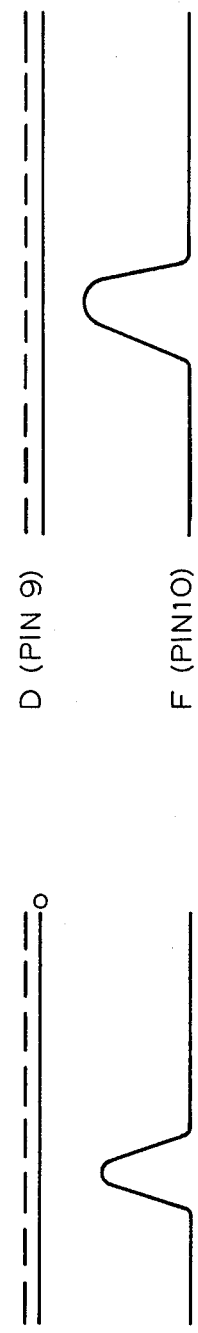
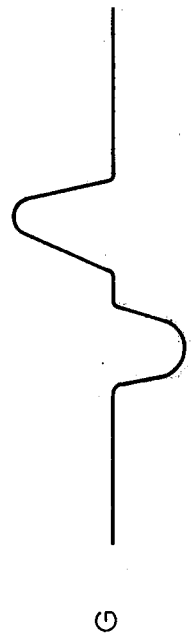
FIG.7

BIDIMENSIONAL NOISE REDUCTION SYSTEM FOR TELEVISION

BACKGROUND OF THE INVENTION

The present invention relates to noise reduction systems for television and more particularly relates to a noise reduction system for television which processes both vertical and horizontal information.

Unidimensional coring circuits have been known and used in noise reduction systems for television for many years. A common approach taken was to pass a video signal through a frequency-selective filter to separate high and low frequency components thereof with the high frequency components then containing the noise to be reduced. Then the high frequency component signal was passed through a symmetrical threshold circuit commonly referred to as a coring circuit. The coring circuit removed the center of the signal symmetrically without affecting amplitude excursions beyond the threshold level which defined the center or the "core." Then the cored, high frequency component signal was added to the low frequency component in an adding circuit to provide a restored, noise reduced video signal. That prior art approach was exemplified by U.S. Pat. No. 3,117,278 to Johnson (see FIG. 2 thereof) and also by U.S. Pat. No. 3,715,477 to Olson (see FIG. 1 thereof). Those coring circuits basically functioned as low pass filters at low amplitude levels only. Thus, those circuits resulted in loss of picture detail at low amplitude levels. For high amplitude signal levels, those prior art circuits had little, if any, effect. One drawback of those circuits which is overcome by the present invention was the relatively high threshold level required for effective noise reduction. That high threshold level necessarily removed from the picture some of the low level picture information.

One prior art solution to the drawback of loss of picture detail at low amplitude levels was preemphasis of the video signal at one end of a circuit path such as the transmission channel or tape recorder and corresponding deemphasis at the other end thereof. That approach was taken in U.S. Pat. No. 3,286,024 to Melchior and is a philosophy generally followed by Dolby in his U.S. Pats. Nos. 3,846,719, 3,828,280 and 3,903,485. Such an approach was also taken in the field of geophysical survey in the U.S. Pat. No. 2,817,715 to Blake.

One prior art system shown in U.S. Pat. No. 3,769,611 to Scaggs divided wide bandwidth signals such as a television signal up into multiple frequency components and separately processed each component. Although the processing of each of the components with the Scaggs system was smooth, the inherent problem of an unduly high threshold level with corresponding signal degradation remained while another practical problem of matching delays and amplitudes of different channels was introduced.

It has been more recently proposed to improve vertical aperture correction in television cameras by considering picture information bidimensionally in adjacent scan lines of a video signal. That approach was suggested in the Longuet U.S. Pat. No. 3,814,847. While the Longuet patent disclosed a bidimensional noise reduction system, the apparatus described therein for accomplishing noise reduction was hampered by a number of drawbacks overcome by the present invention. A principal drawback of the Longuet system was the provision of but a single coring or threshold circuit for both single horizontal line transitions and multiline vertical information transitions. That single-coring-circuit approach required a higher threshold level which removed more low level picture information than if the threshold were lowered. Thus, Longuet lost the noise reduction benefit of having a bidimensional device that responded differently to line transitions and to multiple-line vertical information transistions. The inherent drawback of the common coring circuit was that the threshold level had to be set at the highest noise level in both the horizontal and vertical domains.

Another drawback of the Longuet system was that it did not take into account the presence of encoded chroma information in the video channel (which is understandable in that the Longuet system was strictly for use at the camera). Thus, the Longuet system was limited to processing red, green, blue, and/or luminance channels at, e.g., the camera, prior to encoding. The present invention overcomes these and other limitations of the Longuet system.

SUMMARY OF THE INVENTION

One object of the present invention is to provide a system for noise reduction of a video signal in which losses in small details resolution resulting from processing is spread over the vertical as well as the horizontal domain.

Another object of the present invention is to provide an improved bidimensional noise reduction system for video which provides separate coring threshold levels in the vertical and horizontal dimensions.

A further object of the present invention is to provide a system which inherently enables luminance noise reduction for a composite color-encoded video signal even in the presence of high chroma subcarrier levels.

A still further object of the present invention is to provide a bidimensional noise reduction system which employs an improved formula for signal processing.

These and other objects and advantages are accomplished in a bidimensional noise reduction system for processing a television signal of recurrent fields of sequentially displaced parallel scanning lines of equal length. The system includes a vertical dimension noise reduction subsystem and a horizontal dimension noise reduction subsystem. But subsystems interact.

The vertical system includes a delay and separation circuit connected to a system input and provides three outputs: the first output corresponding to the system input, a second output corresponding to the system input delayed by one time period of each scanning line, and the third output corresponding to the system input delayed by two time periods of each of the scanning lines. A first combining matrix is connected to the vertical delay and separation circuit and combines the first, second and third outputs in accordance with a predetermined formula to provide an output function as follows:

$$\text{Output} = \frac{\frac{V_1 + V_3}{2} + V_2}{2}$$

A first subtraction matrix is connected to the delay and separation circuit and to the first combining matrix and substracts the output of the combining matrix from the second output of the delay and separation circuit and provides the difference resulting therefrom as an output. A first adjustable threshold coring circuit is connected to the output of the first subtraction matrix and eliminates noise and other low level components of the difference output below a settable threshold level. The coring circuit includes a first threshold adjustment circuit for adjusting the threshold level. A second combining matrix is connected to the output of the first combining matrix and the first coring circuit and combines the signals therefrom to provide an output from the vertical dimension noise reduction subsystem.

The horizontal dimension noise reduction subsystem includes a complementary low pass and high pass filter arrangement having its input connected to the output of the second combiner matrix and having a low frequency output and a high frequency output. The filter arrangement separates the signal put out by the second combining matrix into the low frequency and high frequency components. A second adjustable-threshold coring circuit is connected to the high frequency output of the filter arrangement and eliminates noise and other low level components of the high frequency output below a settable threshold level. The second coring circuit includes an adjustment circuit for adjusting the threshold level. A third combining matrix is connected to the low frequency output of the filter and to the output of the second coring circuit and combines those outputs into a system output signal.

BRIEF DESCRIPTION OF THE DRAWINGS

FIG. 1 is a block diagram of a bidimensional noise reduction system incorporating the principles of the present invention.

FIG. 2 is a block diagram of a modification of the input subsystem for the system of FIG. 1 which is particularly well suited for processing color encoded signals.

FIG. 3 is a view in front elevation of a television screen showing a raster scan, a black horizontal bar and a black block below the bar. A centerline has been added for the purposes of explanation and clarity.

FIG. 4 is a series of planar coordinate diagrams of waveforms of various circuit signals of the vertical subsystem shown in FIG. 1.

FIG. 5 is a series of planar coordinate diagrams of waveforms of various circuit signals of the horizontal subsystem shown in FIG. 1.

FIG. 7 is a series of planar coordinate diagrams of waveforms of various signals at locations in the circuitry shown in FIG. 6.

DETAILED DESCRIPTION OF PREFERRED EMBODIMENTS

Figure 6:
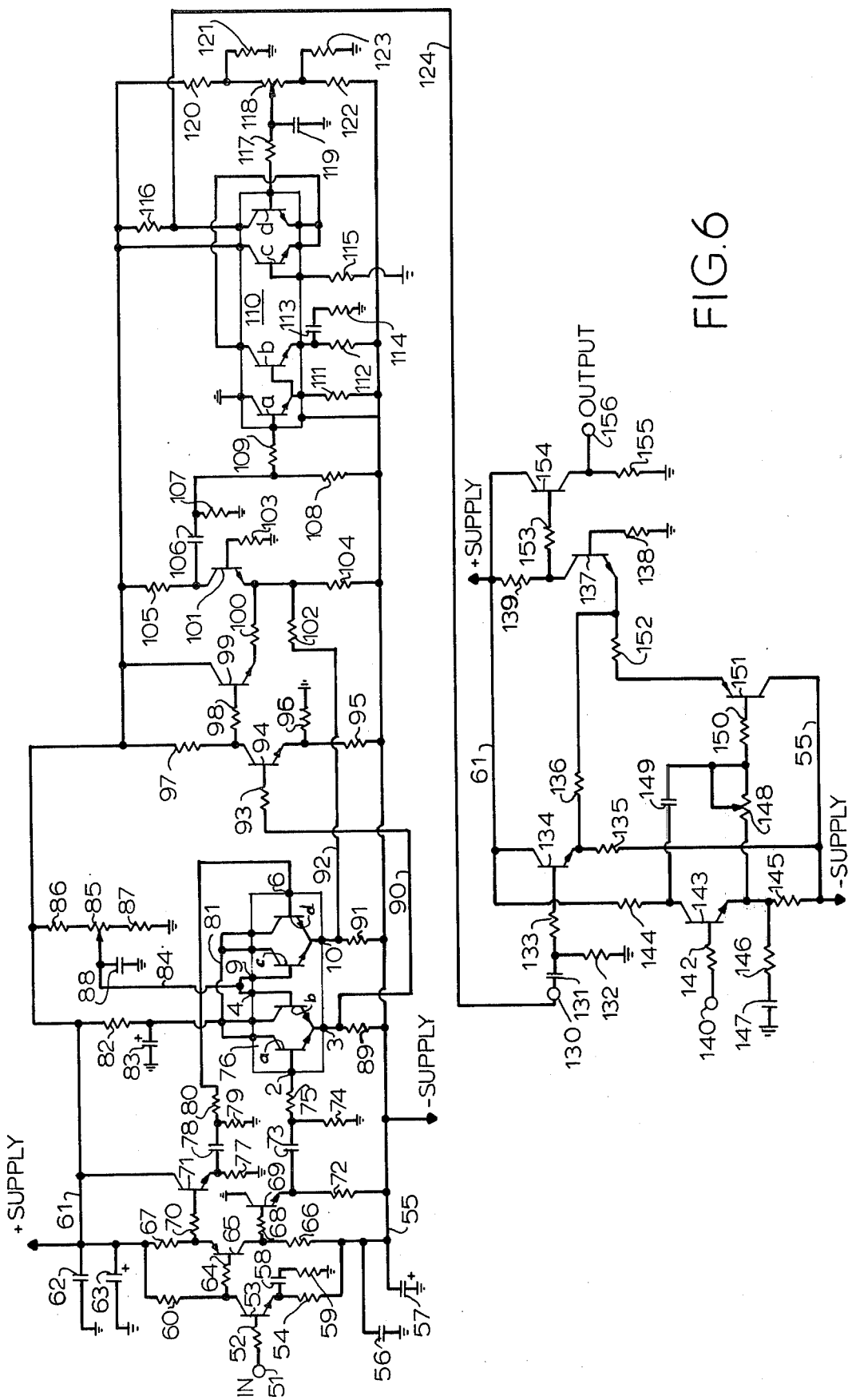
FIG. 6 is a schematic circuit diagram of the coring circuits, threshold controls and following adder circuits of the system of FIG. 1.

A noise reduction system 10 responsive bidimensionally in the vertical and horizontal domains is shown in the block diagram of FIG. 1. This system 10 includes a vertical subsystem 12 to which a horizontal subsystem 14 is connected in tandem. The system includes a video input 16 at the input of the vertical subsystem 12. An output 18 of the vertical subsystem 12 is the input 18 of the horizontal subsystem 14. A system output 20 provides a video output from the horizontal subsystem 14.

Referring now to the vertical subsystem 12, the video input is connected to the input of a one line delay element 22 which is in turn connected to the input of a second one line delay element 24. The delay times of the elements 22 and 24 are equal and correspond to the time duration of each video scanning line. In the United States television system, each delay 22 and 23 is approximately 63.55 microseconds in duration. The delays 22 and 24 function to provide three signals: $V_1$, $V_2$ and $V_3$ which correspond to vertically aligned dots above three adjacent scanning lines in the television picture (FIG. 3). The waveforms for $V_2$ for scanning lines $N_0$, $N_1$, $N_2$ and $N_3$, etc., are shown in the waveform diagram of FIG. 4. The scanning lines $N_0$, $N_1$, $N_2$ and $N_3$ are shown in enlarged spatial arrangement on the television screen depicted in FIG. 3.

The vertical subsystem 12 includes a first adder circuit 26. The adder circuit receives the $V_1$ signal from the video input 16, the $V_2$ signal from the output of the first delay line 22, and the $V_3$ signal from the output of the second delay line 24. THe adder combines the $V_1$, $V_2$ and $V_3$ signals to provide an average output (waveform B of FIG. 4) in accordance with the following formula:

$$\text{Output} = \frac{\frac{V_1 + V_3}{2} + V_2}{2} \quad (1)$$

The output of the first adder circuit 26 is supplied as a subtrahend input to a first subtractor circuit 28. A minuend input is the $V_2$ signal provided as the output from the first delay line 22. The output of the first subtractor circuit 28 is shown as waveform C of FIG. 4 wherein C is expressed in accordance with the formula:

$$C = \frac{V_2 - \frac{V_1 + V_3}{2}}{2} \quad (2)$$

Shown in waveform C are two different signals $N_1$ and $N_2$ as well as random vertical lines along the T axis which represent noise to be removed. The dashed horizontal lines in waveform C represent the threshold level to remove the noise.

The output of the first subtractor circuit 28 is supplied as an input to the first coring circuit 30. The coring circuit 30 includes a threshold control circuit 32 which is implemented as a manually adjustable potentiometer. The circuit details of the coring circuit 30 and threshold control 32 are shown in FIG. 6 and discussed hereinafter. The output of the coring circuit 30 (waveform D of FIG. 4) is supplied as one input to a second adder circuit 34. Also supplied to a second adder circuit 34 is the output of the first adder circuit 26 (Waveform B). The combination of waveforms B and D in the adder circuit 34 produces the waveform E of FIG. 4 which is the output 18 of the vertical subsystem 12. As shown in FIG. 4, the vertical subsystem 12 has a different output response for high level signals than it does for low level signals. For high level signals, the vertical subsystem 12 is essentially inoperative and the output waveform E-1 mimics the $V_2$ input waveform. For low level signals in which the circuit has cored or removed the noise below the preset threshold, the output response, waveform E-2 is slightly blurred and mimics the output of the first adder, waveform B.

As mentioned above, the output 18 of the vertical subsystem 12 provides the input to the horizontal subsystem 14. This input is shown as waveform E-3 in the horizontal dimension waveform diagram of FIG. 5. The waveforms shown in FIG. 5 for the horizontal subsystem 18 are divided into two parts. THe left side shows the response of the system for high levels whereas the right column shows the response of the system for low levels. Although the amplitudes appear to be the same, the right column low level waveforms have been greatly enlarged by the scale shown roughly in waveform G which shows by dashed lines the same threshold level for high levels as for low levels.

Figure 8:
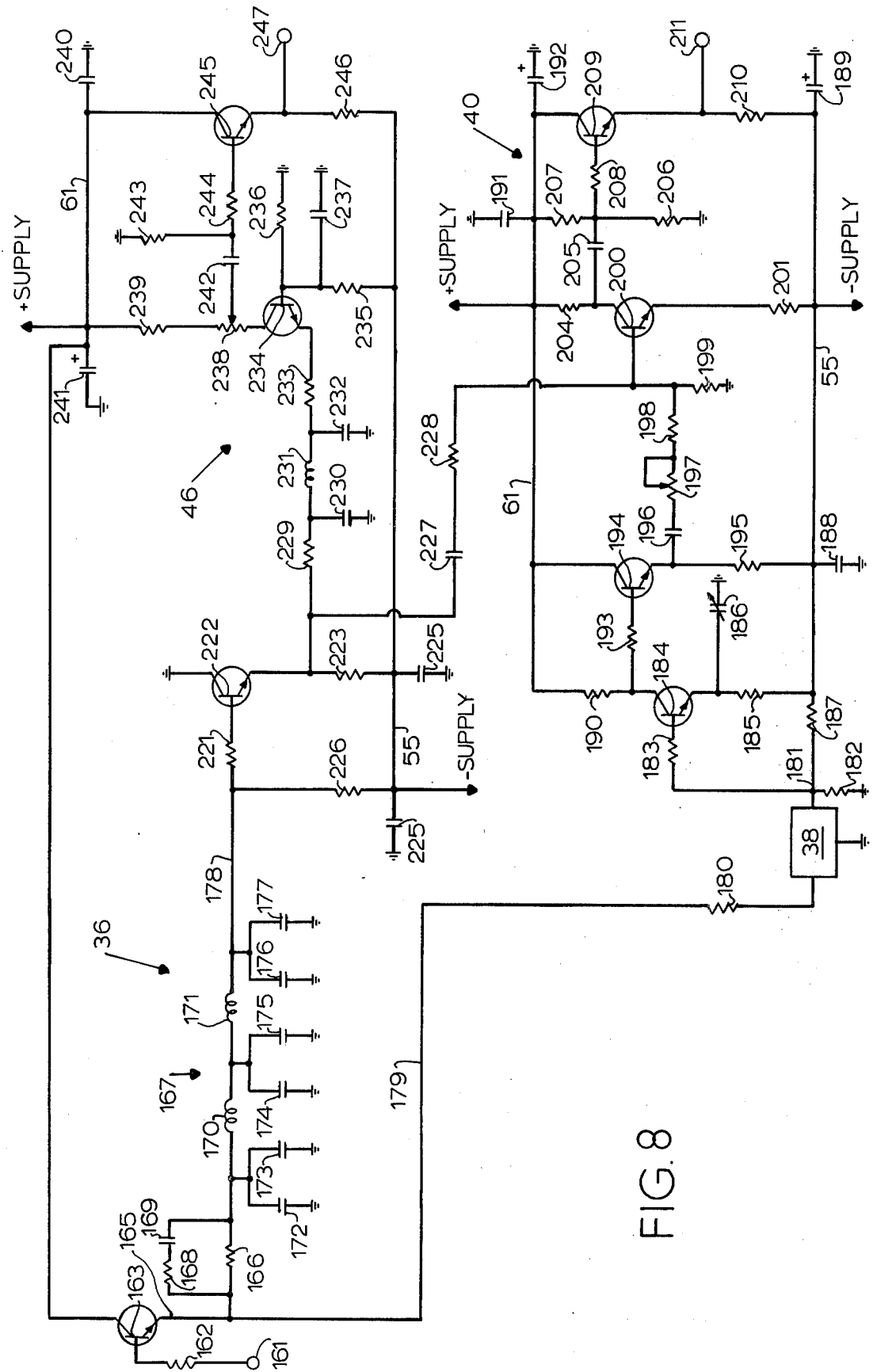
FIG. 8 is a schematic circuit diagram of the low pass filter delay and second subtractor elements of the horizontal subsystem 14 shown in FIG. 1.

Referring again to FIG. 1, the low pass filter 36 is implemented as a 2.0 megahertz Gaussian filter, as shown in FIG. 8 and discussed hereinafter. The input 18 of the horizontal subsystem 14 is also passed through a delay circuit 38 which corresponds to the delay introduced by the low pass filter 36. The output of the delay circuit 38 provides a minuend input to a second subtractor circuit 40. The subtrahend input to the subtractor circuit 40 is provided from the output of the low pass filter 36. The function of the subtractor circuit 40 is to subtract the low pass components of the video signal from the signal so that the output of the subtractor 40 is a high frequency component, shown as waveform G in FIG. 5.

The high frequency signal from the subtractor 40 is input to the second coring circuit 42 which includes a threshold control circuit 44. The coring circuit 44 operates substantially identically with the coring circuit 30 except that the horizontal threshold shown as dashed lines in waveform G of FIG. 5, is set by the threshold control 44. Importantly, the control 44 operates independently of the control 32 so that optimum thresholds may be set in the vertical as well as horizontal domains.

The output of the coring circuit 32 (waveform H of FIG. 5) is supplied as one input to a third adder circuit 46. A second input to the adder circuit is provided from the output of the low pass filter circuit 36. Thus, the cored high frequency component output from the coring circuit 42 and the low frequency component from the output of the low pass filter 36 are combined by the adder circuit 46 to provide a restored full bandwidth video signal which has been processed for noise reduction in both the vertical and horizontal domains. The operation of horizontal subsystem 14 is shown by comparison of the output waveforms J with input waveforms. For high levels, the outputs of the horizontal subsystem 14 mimic the input, that is, waveform J (high level) mimics waveforms E-3 (high level). For low levels, output waveform J mimics the output of the low pass filter (waveform F). Thus, at low levels, there is a slight picture degradation on account of the signal processing occurring in the horizontal subsystem 14. However, by independently adjusting thresholds in the vertical and horizontal domains, the effect of degradation or blurring of the picture at low levels is substantially reduced, almost to the point of being unnoticeable, except to a skillful observer or with electronic instruments. Yet, the reduction in noise brought about by the operation of the noise reduction system 10 is most apparent in improving the quality of the picture.

The system depicted in FIG. 1 effectively reduces noise bidimensionally for luminance video signals, which may include color camera signals not yet being color encoded. The circuit modification set forth in FIG. 2 enables the system 10 effectively to reduce noise bidimensionally in colorencoded signals.

All recognized color television encoding schemes use a high frequency color subcarrier which is superimposed upon the luminance channel at the high frequency end of the spectrum thereof. Consequently, the presence of a color subcarrier would render the coring circuits 30 and 42 of FIG. 1 ineffective because the level of the color subcarrier would exceed the predetermined threshold limits set for typical video levels. To eliminate this problem, two low pass filters 23 and 25 effectively remove the chroma subcarrier information from the signal at circuit locations B and C before the signal is applied to the second adder circuit 34 and to the coring circuit 30. In the modification shown in FIG. 2, the low pass filter 23 is connected between the subcontractor 28 and the coring circuit 30, while the low pass filter 25 is connected between the first adder 26 and the second adder circuit 34.

CORING CIRCUITS 30 AND 42

FIG. 6 sets forth the schematic circuit diagram of the coring circuits 30 and 42. The circuit shown in FIG. 6 is one coring circuit, there being two separate and substantially identical circuits implementing the coring elements 30 and 42. The only variations between the implementations for the circuits for 30 and 42 are component value changes to accommodate the different time scale requirements for the vertical and horizontal time domains.

The coring circuit has an input 51, which for the coring circuit 30 connects from the output of the first subtractor 28, and for the coring circuit 42 connects to the output of the second subtractor 40. A stabilizing, oscillation preventing resistor 52 is connected between the input 51 and the base of an NPN transistor 53 which functions as an amplifier. The emitter of the transistor 53 has a series resistor 54 to a minus supply voltage bus 55 which is decoupled for high frequencies by a small disc ceramic capacitor 56 and for low frequencies by large value electrolytic capacitor 57.

A high-frequency-gain producing network including a capacitor 58 and a series resistor 59 is connected to the emitter of the transistor 53. The collector of the transistor 53 is connected through a load resistor 60 to a positive supply voltage bus 61. As with the negative supply bus 55, the positive bus 61 is decoupled for high frequencies by a small value disc ceramic capacitor 62 and for low frequencies by a larger value electrolytic capacitor 63.

The output from the transistor amplifier 53 is taken from the collector through an oscillation inhibiting and isolating resistor 64 to the base of a PNP transistor 65 which functions as a 180° phase splitter. The transistor 65 includes a collector load resistor 66 which is connected to the minus supply voltage bus 55 and an emitter resistor 67 (of the same value as the resistor 66) which is connected to the positive supply bus 61. An isolating resistor 68 interconnects the collector of the transistor 65 and the base of an NPN emitter follower transistor 69 having its collector grounded. In symmetrical fashion, the output from the emitter of the transistor 65 is taken through an isolating resistor 70 to the base of an emitter follower transistor 71 having its collector connected to the plus voltage supply bus 61.

The emitter of the transistor 69 is connected to the minus supply bus 55 through a load resistor 72. The output from the emitter follower transistor 69 is taken from the emitter through a blocking capacitor 73 to a resistor network including a resistor 74 to ground and a resistor 75 to the base of a transistor in an array 76. The array 76 includes four NPN transistors formed on a single monolithic integrated circuit substrate. An RCA type CA 3046 integrated circuit is preferred for the implementation of the array 76. The transistors of the array 76 are paired, thus transistor 76a and 76b form one pair with a common emitter connection, and pairs 76c and 76d form a pair with a common emitter connection. While each matched pair of transistors 76a and 76b, 76c and 76d, acts as a matched pair of emitter followers, only one of the transistor pair 76a and 76b and only one of the transistor pair 76c and 76d may conduct at a time.

When the signal on the base of one of the transistors, for example the base of the transistor 76a (pin 2), is more positive than the signal on the base of the other transistor of the pair, for example the base of transistor 76b (pin 4), the common emitters (pin 3) will mimic the signal appearing at the base of the transistor 76a (pin 2). When the signal on the base of the transistor 76a is less positive than the voltage appearing at the base of the transistor 76b, the emitters will then mimic the signal appearing at the base of the transistor 76b.

Output from the emitter follower transistor 71 is taken from the emitter through a blocking capacitor 78 to a network made up of a resistor 79 to ground and a resistor 80 which connects to the base of the transistor 76d of the array 76 (pin 6). The collectors of the transistor 76a, 76b, 76c, 76d, are connected together by a wire 81 which connects through a resistor 82 to the positive supply bus 61. A decoupling capacitor 83 is connected to the wire 81 to provide the transistors of the array 76 as pairs of emitter followers.

The bases (pins 4 and 9) of the transistors 76b and 76c are connected together by a wire 84 which is connected to the wiper contact of a threshold adjustment potentiometer 85. One end of the potentiometer 85 is connected through a series resistor 86 to the plus supply bus 61, and the other end of the potentiometer 85 is connected through a series resistor 87 to ground. A decoupling capacitor 88 is connected to the wire 84 to decouple the bases of the transistors 76b and 76c.

The common emitters of the transistors 76a and 76b are connected through a load resistor 89 to the minus supply bus 55. Output from the transistor pair 76a and 76b is taken from the emitter (pin 3) via a wire 90. In similar fashion, the emitters (pin 10) of the transistors 76c and 76d are connected to the minus supply bus 55 through a load resistor 91. Output from the transistors 76c and 76d is taken from the common emitter via a wire 92. The output appearing on the wire 92 is the complement of the output appearing on the wire 90.

The operation of the array 76 to provide threshold coring will now be explained. With reference to FIG. 7, the signal appearing in pin 2 of the array 76 is shown as a sine wave in waveform A of FIG. 7. The phase inverted signal appearing at pin 6 of the array 76 is shown as waveform B of FIG. 7. The signal appearing at pin 4 of the array 76 is shown as waveform C of FIG. 7. The dash line represents a DC potential above a zero reference, and is the positive threshold level set up by the potentiometer 85. The same voltage provides the positive threshold level at pin 9 and is shown as waveform D of FIG. 7. The output of the first emitter pair, transistors 76a and 76b is shown as waveform E of FIG. 7 as that portion of the positive envelope of the signal appearing in pin 2 which is above the threshold level at pin 4. Similarly, the output of the transistor pair 76c and 76d is shown as waveform F of FIG. 7 to be that portion of the positive envelope of the input signal at pin 6 which is above the threshold level set at pin 9. When the signals at pins 3 and 10 are added together after inversion of waveform E, they produce the waveform shown as waveform G of FIG. 7 which is the input waveform offset by the threshold. In the signal shown as waveform G of FIG. 7, the central portion thereof has been removed, and with it, low level signals including, particularly, non-transitional noise.

Returning to FIG. 6, the circuitry implementing adding circuits will be described. The non-inverted output appearing on line 90 from the array 76 is taken through a resistor 93 to the base of an inverting amplifier NPN transistor 94, having its emitter connected to a voltage divider network consisting of a resistor 95 to the minus voltage bus 55 and a resistor 96 connected to ground. A load transistor 97 connects the collector of the transistor 94 to a plus supply bus 61. Output from the transistor 94 is taken at the collector through a resistor 98 to the base of a transistor 99 configured as an emitter follower, with its collector connected directly to the plus supply bus 61. A resistor 100 interconnects the emitter of the transistor 99 and the emitter of an NPN adder transistor 101.

The signal output from the array 76 via the line 92 is connected through a level matching resistor 102 to the emitter of the transistor 101. The amplifier 94 and the emitter follower 99 function to delay, invert and level-equalize the signal appearing on the line 90 with the signal appearing on line 92, so that the transistor 101 adds together signals of proper amplitude, polarity, and timing. The transistor 101 is configured as a common base amplifier with its base connected to ground via a resistor 103. An emitter resistor 104 connects the emitter of the transistor 101 to the negative supply bus 55, and a load resistor 105 connects the collector of the transistor 101 to the positive supply bus 61.

Output is taken from the collector of the transistor 101 through a blocking capacitor 106 to a node including a resistor 107 to ground, a resistor 108 to the minus supply bus 55 and a series resistor 109 leading to the base of a first transistor of the transistor array 110. The transistor array 110 includes four NPN transistors 110a, 110b, 110c and 110d formed on a single monolithic integrated circuit substrate and is preferably implemented as an RCA type CA 3018 integrated circuit.

As configured in FIG. 6, the array 110 along with the peripheral circuit elements, provides a gain control circuit for the coring circuit. The first transistor 110a has its collector connected to ground and its emitter connected to the minus supply bus 55 through a resistor 111 and also is connected to the base of the second transistor of the array 110b. The emitter of the second transistor 110b is connected to the minus supply bus 55 through a resistor 112. A frequency compensating network including a series capacitor 113 and resistor 114 is connected from the emitter of the transistor 110b to ground.

The base of the transistor 110c is connected to ground through a series resistor 115, and the collector thereof is connected directly to the plus supply bus 61. The emitter of the transistor 110c is connected in common with the emitter of the transistor 110d and they are in turn connected to the collector of the transistor 110b. The collector of the transistor 110d is connected to the plus supply bus 61 through a resistor 116. The base of the transistor 110d is connected through a series resistor 117 to the wiper of a gain control potentiometer 118. The wiper of the control 118 is bypassed to ground by a capacitor 119. The potentiometer 118 has one end connected to a common node of a resistor network made of a resistor 120 connected to a plus supply bus 61 and a resistor 121 connected to ground. The other end of the potentiometer 118 is connected to the common node of a resistor network including a resistor 122 to the minus supply bus 55 and a resistor 123 to ground. The output from the gain control circuit array 110 is taken from the collector of the transistor 110d via a line 124.

The current provided by transistor 110b is directed to transistors 110c and 110d and will flow in preference through transistors 110c or 110d, depending on which has the most positive base voltage. Operation of the wiper of potentiometer 118 will therefore direct more or less current to transistor d and will modify the gain of the array 110.

ADDER CIRCUITS 34, 46

The implementation of each of the adder circuits 34 and 46 is shown in FIG. 6, both circuits having substantially the same structure with differences in component values being related to the different frequencies for the vertical and horizontal time domains. The adder circuits have an input 130 which, for the implementation of the second adder circuit 34, receives a signal from the first coring circuit 30 which is shown as waveform D of FIG. 4. For the third adder circuit 46, the input 130 receives a signal from the second coring circuit 42 which is shown as waveform H of FIG. 5. The input 130 is connected through a blocking capacitor 131 to the common node of a resistance network of a resistor 132 to ground and a resistor 133 connecting to the base of an emitter follower NPN transistor 134 which has its collector directly connected to the plus voltage bus 61. The emitter of the transistor 134 includes a load resistor 135 which is connected to the minus supply bus 55.

Outout from the emitter of the transistor 134 is taken through a level matching resistor 136 to the emitter of a common base configured transistor 137 which has its base connected to ground through a bias resistor 138. The collector of the transistor 137 is connected to the plus supply bus 61 through a load resistor 139. A second input to the adder circuit is provided at the node 140. For the adder 34, the input 140 is connected to the output of the first adder circuit 26. In the implementation of the third adder circuit 46, the node 140 is connected to the output of the low pass filter 36. Thus, the signal input at the node 140 for the adder 34 is waveform B of FIG. 4, and for the implementation of the adder 46 is waveform F of FIG. 5. The input node 140 is connected through a resistor 142 to the base of a delay matching transistor 143 which is an NPN transistor having a collector load resistor 144 connected to the plus supply bus 61 and an emitter resistor connected to the minus supply bus 55 through a resistor 145. A frequency compensating network is connected to the emitter which includes a resistor 146 and a capacitor 147 to ground.

The output from the delay matching transistor 143 is taken from the emitter and passed through a potentiometer 148 having its wiper connected to one side thereof. A feedback capacitor 149 is connected from the collector of the transistor 143 to the fixed terminal of the potentiometer 148 opposite the emitter of the transistor 143. The node interconnecting the capacitor 149 and the potentiometer 148 is connected by a resistor 150 to the base of an emitter follower PNP transistor 151 which has its collector directly connected to the minus supply bus 55 and its emitter connected through a matching resistor 152 to the emitter of the adder transistor 137.

Thus the signals appearing at the inputs 130 and 140 come together at the emitter of the transistor 137 and are added together by that stage with delay matching thereof being provided by the potentiometer 148. Output is taken from the transistor 137 at the collector thereof through a resistor 153 to the base of an emitter follower NPN transistor 154 which has its collector connected directly to the plus supply bus 61 and has its emitter connected to ground through a load resistor 155. An output 156 for the adder circuit provides the output node 18 for the vertical subsystem 12 and the system output 20 for the horizontal subsystem 14.

LOW PASS FILTER 36, DELAY 38, SUBTRACTOR 40

With reference now to FIG. 8, the circuitry which implements the low pass filter 36, the delay 38 and the subtractor circuit 40 of the horizontal subsystem 14 is set forth.

The low pass filter 36 has an input 161 which is connected through a resistor 162 to the base of an emitter follower NPN transistor 163 which has its collector connected to the plus supply bus 61. The emitter 165 is likewise connected to the minus supply bus 55 through the output circuit now to be described.

The output from the emitter follower transistor amplifier 163 is taken through a resistor 166 to the input of the Gaussian low pass filter 167 made up of passive capacitive and inductive elements whose values are set forth in FIG. 8. In parallel across the resistor 166 is an RC network including a resistor 168 and a capacitor 169. The Gaussian filter 167 includes two series inductors 170 and 171 to which six parallel capacitors are connected to ground. Thus, capacitors 172 and 173 connect at the input of the filter 167, capacitors 174 and 175 connect to the common node between the inductors 170 and 171, and capacitors 176 and 177 connect to the output of the filter 167 which is a wire 178. The filter 167 has a six dB roll off point at two megahertz. The emiter 165 of the input transistor 163 is provided with a dc path to the minus supply bus 55 through the series connected resistor 166, inductors 170 and 171 and a resistor 226.

A wideband signal is taken from the emitter of the input transistor 163 via a line 179 and is passed through a resistor 180 to the input of a passive delay network which implements the delay 38. The delay 38 may be implemented in active or active and passive elements as well as passive only devices. The three terminal device of the delay 38 includes a ground lead and an output 181 which has an impedance matching resistor 182 to ground and connects through a series resistor 183 to the input of an amplifier NPN transistor 184. The emitter of the transistor 184 is connected through a resistor 185 to the minus supply bus 55. The emitter is also coupled to ground by a variable capacitor 186 which enables the delay of the delay network 38 to be perfectly matched to the delay of the low pass filter 167. A resistor 187 interconnects the output 181 of the delay 38 and the minus supply bus 55 and provides the necessary bias voltage to the base of the transistor 184. The minus supply bus 55 is bypassed at high frequencies by a small value disc ceramic capacitor 188 and at low frequencies by a large value electrolytic capacitor 189. The collector of the transistor 184 is connected through a load resistor 190 to the plus supply bus 61. That bus is bypassed for high frequencies by a small value disc ceramic capacitor 191 and for low frequencies by a larger value electrolytic capacitor 192.

The output from the transistor amplifier 184 is taken from the collector through a matching resistor 193 to the base of a transistor 194 configured as an emitter follower with its collector connected directly to the plus supply bus 61. A load resistor 195 interconnects the emitter of the transistor 194 and the minus supply bus 55. Output is taken from the emitter of the transistor 194 through a low impedance blocking capacitor 196 and then through a poentiometer 197 and a fixed resistor 198. The wiper of the potentiometer 197 is connected to the node between the potentiometer 197 and the resistor 198.

The output is thence taken through a resistor 199 to ground and to the base of an NPN transistor 200 which functions as the subtractor 40 of the horizontal subsystem 14. The emitter of the transistor 200 is connected to the minus supply bus 55 through a resistor 201. The emitter is also bypassed to ground by network including a resistor 202 and a capacitor 203. The collector of the transistor 200 is connected to the plus supply bus 61 through a load resistor 204. Output from the transistor 200 is taken from the collector through a blocking capacitor 205 to a common node of a resistance network including a resistor 206 to ground, a resistor 207 to the plus supply bus 61 and a resistor 208 to the base of an NPN emitter follower transistor 209. The transistor 209 has its collector connected directly to the plus supply bus 61 and has its emitter connected to the minus supply bus 55 through a load resistor 210. An output 211 of the subtractor 40 is provided by a connection to the emitter of the transistor 209. The signal appearing at the output 111 is shown as waveform G in FIG. 5 and includes high frequency components including noise which are processed by the coring circuit 42.

The low pass filtered output from the Gaussian filter 167 on the output line 178 is supplied through a series resistor 221 to the input of an emitter follower NPN transistor 222 having its collector connected directly to ground and its emitter connected through a load resistor 223 to the minus supply bus 55. Again, the bus 55 is bypassed for high frequency components by a small value disc capacitor 224 and for low frequencies by a large value electrolytic capacitor 225. The resistor 226 interconnects the minus supply bus 55 and the line 178 to provide bias voltage to the base of the transistor 222 as well as a dc path to the emitter 165 of the transistor 163. Output from the emitter follower transistor 222 is taken from the emitter through a capacitor 227 and a series resistor 228 to the base of the subtractor 228 to the base of the subtractor transistor 200 so that the low pass filtered signal on the line 178 may there be subtracted from the signal passed from the delay 38 by the subtractor transistor 200 in the subtractor circuit 40.

With reference to FIG. 1, the signal from the low pass filter 36 is also provided as an input to the adder circuit 46, and the circuitry providing that input (shown in FIG. 8) to the adder circuit 46 will now be explained. A signal output from the emitter follower transistor 222 is also taken from the emitter thereof through a resistor 229 to a delay equalizing network comprising a parallel capacitor 230 to ground, a series inductor 231 and a parallel capacitor 232 to ground and a matching resistor 233 to the emitter of the NPN transistor amplifier 234. This network functions to equalize the delays for the two input paths to the adder circuit 46.

The transistor 234 is configured as a common base circuit with its base connected to the minus supply bus 55 through a bias resistor 235. The base is also connected to ground through a bias resistor 236. The base is coupled to ground via a bypass capacitor 237. The collector of the transistor 234 is connected through a potentiometer 238 and a resistor 239 to the plus supply bus 261 which is bypassed to ground for high frequency components by a small value disc capacitor 240 and for low frequency components by an electrolytic capacitor 241. Output from the transistor 234 is taken via the wiper of the potentiometer 238 through a capacitor 242 to a divider network of a resistor 243 to ground and a series resistor 244 to the base of an amplifier NPN transistor 245 configured as an emitter follower, with the collector thereof connected directly to the plus supply bus 61. The emitter of the transistor 245 is connected to the minus supply bus 245 through a load resistor 246. The low frequency output from the Gaussian filter 36 to the third adder circuit 46 is taken from the emitter of the transistor 245 at the output 247.

To those skilled in the art to which this invention relates, many changes in construction and widely differing embodiments and application of the bidimensional noise reduction system for television invention will suggest themselves without departing from the spirit and scope of the invention. The disclosures and the description herein are purely illustrative and are not intended to be in any sense limiting.

I claim:

1. A bidimensional noise reduction system for processing a television video signal of recurrent fields of sequentially displaced parallel scanning lines of equal length, said system comprising a vertical dimension noise reduction subsystem including:

(a) a system input;

(b) delay and separation means connected to said system input for providing three outputs: a first output corresponding to said system input, a second output corresponding to said system input delayed by one time period of each of said scanning lines, and a third output corresponding to said system input delayed by two time periods of each of said scanning lines, said delay and separation means having an output;

(c) first combiner matrix means connected to said vertical delay and separation means for combining said first, second and third outputs in accordance with a predetermined formula to provide an output which is a function thereof;

(d) first subtractor matrix means connected to said delay and separation means and to said first combiner matrix means for subtracting said output of said combiner matrix means from said second output of said delay and separation means and having an output being the difference therebetween;

(e) first adjustable-threshold coring circuit means connected to said output of said first subtractor matrix means for eliminating noise and other low level components of said difference output below a settable threshold level, said first coring circuit means including first threshold adjustment means for adjusting said threshold level, and having an output;

(f) second combiner matrix means connected to said outputs of said first combiner matrix means and said first coring circuit means for combining the signals therefrom, and having an output, and a horizontal dimension noise reduction subsystem including:

(g) complementary high pass and low pass filter means having an input connected to said second combiner matrix means, and having a low frequency output and a high frequency output, said filter means for dividing the signal put out by said second combiner matrix means into said low frequency output and said high frequency output;

(h) second adjustable-threshold coring circuit means connected to said high frequency output of said filter means for eliminating noise and other low level components of said high frequency output below a settable threshold level, said second coring circuit means including second threshold adjustment means for adjusting said threshold level, and having an output;

(i) third combiner matrix means connected to said low frequency output of said filter means and to said output of said second coring circuit means, for combining said low frequency output and said second coring circuit means output into a system output signal, and providing it as a system output.

2. The bidimensional noise reduction system set forth in claim 1 wherein said delay and separation means comprises first delay means for providing a fixed delay equal to the time period of each of said scanning lines, said first delay means having an input connected to said system input and an output connected as one input $V_2$ to said first combiner matrix means, and second delay means for providing a fixed delay equal to the time period of each of said scanning lines, said second delay means having an input connected to said output of said first delay means and having an output connected as a second input $V_3$ to said first combiner-matrix means, and wherein said first combiner-matrix means has a third input $V_1$ connected directly to said system input.

3. The bidimensional noise reduction system set forth in claim 2 wherein said first combiner-matrix means combines said inputs $V_1$, $V_2$, $V_3$ to provide its said output substantially in accordance with the formula $$\text{Output} = \frac{\frac{V_1 + V_3}{2} + V_2}{2}$$

4. The bidimensional noise reduction system set forth in claim 1 additionally comprising low pass filter means connected between the output of said first combiner matrix means and said second combiner matrix means.

5. The bidimensional noise reduction system set forth in claim 1 additionally comprising low pass filter means connected between the output of said first subtractor matrix means and said first adjustable-threshold coring circuit means.

6. The bidimensional noise reduction system set forth in claim 5 additionally comprising low pass filter means connected between the output of said first combiner matrix means and said second combiner matrix means.

7. The bidimensional noise reduction system set forth in claim 1 wherein said complementary high pass and low pass filter means comprises:

(a) second low pass filter means having an input connected to said output of said second combiner-matrix means for passing low frequency signal components, and having an output, (b) third delay means having an input connected to said output of said second combiner-matrix means for providing a fixed delay equal to the transit delay through said second low pass filter means, and having an output, and (c) second subtractor-matrix means having a minuend input connected to said output of said third delay means, having a subtrahend input connected to said output of said second low pass filter means, and having an output being the difference between said minuend and subtrahend inputs and connected to said input of said second adjustable threshold coring circuit means and wherein said connection of said third combiner matrix means to said low frequency output of said filter means comprises a connection to said output of said second low pass filter means.

8. The bidimensional noise reduction system set forth in claim 1 wherein at least one of said first adjustable-threshold coring circuit means and said second adjustable-threshold coring circuit means includes:

(a) four transistors of the same electrical characteristic and formed on a single monolithic integrated circuit substrate, first two of said transistors connected together at emitters and collectors to form a first pair, and second two of said transistors connected together at emitters and collectors to form a second pair;

(b) bias means for providing an adjustable direct current bias voltage to the base of one of the transistors of said first and second pairs;

(c) phase splitter means having an input connecting to said input of each said coring circuit, for providing two outputs therefrom one phase shifted from the other by one hundred eighty degrees, said outputs each being connected to the other of the transistors of said first and second pairs;

(d) inverter means connected to a signal output of one of said first and second transistor pairs and having an output;

(e) adding circuit means having one input connected to a signal output of the other of said first and second transistor pairs and another input connected to said output of said inverter means.

9. A bidimensional noise reduction system for processing a television video signal of recurrent fields of sequentially displaced parallel scanning lines of equal length, said system comprising a vertical dimension noise reduction subsystem including:

(a) a system input;

(b) delay and separation means connected to said system input for providing three outputs: a first output corresponding to said system input, a second output corresponding to said system input delayed by one time period of each said scanning lines, a third output corresponding to said system input delayed by two time periods of each of said scanning lines, said delay and separation means having an output;

(c) first combiner-matrix means connected to said vertical delay and separation means for combining said first, second and third outputs in accordance with a predetermined formula to provide an output which is a function thereof;

(d) first subtractor matrix means connected to said delay and separation means and to said first combiner matrix means for subtracting said output of said combiner matrix means from said second output of said delay and separation means and having an output being the difference therebetween;

(e) first adjustable threshold coring circuit means connected to said output of said first subtractor matrix means for eliminating noise and other low level components of said difference output below a settable threshold level, and having an output, (f) second combiner matrix means connected to said outputs of said first combiner matrix means and said first coring circuit means for combining the signals therefrom, and having an output, and a horizontal dimension noise reduction subsystem including:

(g) low pass filter means having an input connected to said output of said second combiner matrix means for passing low frequency components, and having an output, (h) delay means having an input connected to said output of said second combiner matrix means for providing a fixed delay equal to the transit delay through said low pass filter means, and having an output;

(i) second subtractor matrix means having a minuend input connected to said output of said delay means and having a subtrahend input connected to said output of said low pass filter means, said second subtractor matrix means for subtracting its said subtrahend input from its said minuend input to provide as an output a difference signal in which low frequency components are removed;

(j) second adjustable threshold coring circuit means connected to said output of said second subtractor matrix means for eliminating noise and other low level components of said difference signal below a settable threshold level, and having an output;

(k) third combiner matrix means connected to said outputs of said low pass filter means and said second coring circuit means, said third combiner matrix means for providing a system output which is said video signal in which noise has been reduced by processing of both vertical and horizontal dimensions.

10. A bidimensional noise reduction system for a television video signal of recurrent fields of sequentially displaced, parallel scanning lines of equal length, said system comprising:

a vertical dimension noise reduction subsystem including:

(a) a system input for receiving said video signal with noise therein;

(b) first delay means for providing a fixed delay equal to the time period of each said scanning line having an input connected to said input and having an output;

(c) second delay means for providing a fixed delay equal to the time period of each said scanning line, having an input connected to the output of said first delay means, and having an output;

(d) first adder means having three inputs: a first input $V_1$ connected to said system input, a second input $V_2$ connected to said output of said first delay means, and a third input $V_3$ connected to said output of said second delay means, said adder means for adding said three inputs and having an output which is the function of:

$$\text{Output} = \frac{\frac{V_1 + V_3}{2} + V_2}{2}$$

(e) first subtractor means having a minuend input connected to said output of said first delay means and having a subtrahend input connected to said output of said first adder means, said first subtractor means for subtracting said subtrahend input from said minuend input, and having an output of the resulting difference, (f) first adjustable coring circuit means having an input for eliminating noise and other low level components of said difference below a settable threshold connected to said output of said subtractor means, and having an output;

(g) second adder means having a first input connected to said output of said first adjustable coring circuit means and a second input connected to said output of said first adder means and having an output which corresponds to the said $V_2$ second input of said first adder means for high level signal components and which corresponds to low level signal components to the function:

$$\text{Output} = \frac{V_2 + \frac{V_1 + V_3}{2}}{2} \text{ ; and}$$

a horizontal dimension noise reduction subsystem including:

(h) low pass filter means having an input connected to said output of said second adder means and having an output, said filter means for passing low frequency components of the signal output from said second adder means;

(i) third delay means for providing a fixed delay equal to the transit delay through said low pass filter means, said third delay means having an input connected to said output of said second adder means and having an output;

(j) second subtractor means having a minuend input connected to said output of said third delay means and having a subtrahend input connected to said output of said low pass filter means, said second subtractor means for subtracting said low pass filter output from said third delay means output to provide an output signal in which low frequency components are removed;

(k) second adjustable coring circuit means for eliminating noise and other low level components of said output of said second subtractor means below a settable threshold, said second coring circuit means having an input connected to said output of said second subtractor means and having an output;

(l) third adder means having a first input connected to said output of said low filter means, having a second input connected to said output of said second adjustable coring circuit means, and providing a system output of said video signal with noise therein reduced in both the vertical and horizontal dimensions.

* * * * *

UNITED STATES PATENT AND TRADEMARK OFFICE
CERTIFICATE OF CORRECTION

PATENT NO. : 4,142,211
DATED : February 27, 1979
INVENTOR(S) : YVES C. FAROUDJA

It is certified that error appears in the above-identified patent and that said Letters Patent are hereby corrected as shown below:

Col. 2, line 45, "But" should read --Both--;

Col. 6, line 14, "subcontractor" should read --subtractor--;

Col. 9, line 38, "Outout" should read --output--;

Col. 11, line 14, "poentiometer" should read --potentiometer--;

Col. 16, line 59, "said low filter means" should read --said low pass filter means--.

Signed and Sealed this

Eighteenth Day of September 1979

[SEAL]

Attest:

LUTRELLE F. PARKER

Attesting Officer  Acting Commissioner of Patents and Trademarks